United States Patent
Hudetz et al.

[11] Patent Number: 5,978,773
[45] Date of Patent: *Nov. 2, 1999

[54] SYSTEM AND METHOD FOR USING AN ORDINARY ARTICLE OF COMMERCE TO ACCESS A REMOTE COMPUTER

[75] Inventors: Frank C. Hudetz, Lisle; Peter R. Hudetz, Plainfield, both of Ill.

[73] Assignee: NeoMedia Technologies, Inc., Fort Myers, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/538,365

[22] Filed: Oct. 3, 1995

Related U.S. Application Data

[60] Provisional application No. 60/000,442, Jun. 20, 1995.

[51] Int. Cl.$^6$ .............................. G06F 3/06; G06F 13/20
[52] U.S. Cl. ........................... 705/23; 709/219; 707/523
[58] Field of Search .................................. 395/800, 200.1, 395/201, 829, 200.03, 114, 117, 200.57, 200.61, 200.33; 358/440; 235/383, 380, 375, 462, 385, 432, 466; 364/464.18, DIG. 1, DIG. 2; 382/313, 317; 705/14, 23; 709/219, 217, 220; 707/523

[56] References Cited

U.S. PATENT DOCUMENTS

| | | | |
|---|---|---|---|
| 4,365,148 | 12/1982 | Whitney | 235/383 |
| 4,833,308 | 5/1989 | Humble | 235/383 |
| 4,901,073 | 2/1990 | Kibrick | 341/13 |
| 4,959,530 | 9/1990 | O'Connor | 235/383 |
| 5,038,023 | 8/1991 | Saliga | 235/385 |
| 5,111,391 | 5/1992 | Fields et al. | 364/401 |
| 5,115,326 | 5/1992 | Burgess et al. | 358/440 |
| 5,198,644 | 3/1993 | Pfeiffer et al. | 235/383 |
| 5,288,976 | 2/1994 | Citron et al. | 235/375 |
| 5,296,688 | 3/1994 | Hamilton et al. | 235/375 |
| 5,304,786 | 4/1994 | Pavlidis et al. | 235/462 |
| 5,324,922 | 6/1994 | Roberts | 235/375 |
| 5,331,547 | 7/1994 | Laszlo | 364/413 |
| 5,340,966 | 8/1994 | Morimoto | 235/376 |
| 5,362,948 | 11/1994 | Morimoto | 235/376 |
| 5,382,779 | 1/1995 | Gupta | 235/383 |
| 5,386,298 | 1/1995 | Bronnenberg et al. | 358/403 |
| 5,398,336 | 3/1995 | Tantry et al. | 395/600 |
| 5,405,232 | 4/1995 | Lloyd et al. | 414/280 |
| 5,418,713 | 5/1995 | Allen | 364/403 |

(List continued on next page.)

FOREIGN PATENT DOCUMENTS

| | | |
|---|---|---|
| 0 744 856 A2 | 11/1996 | European Pat. Off. . |
| 0 837 406 A2 | 4/1998 | European Pat. Off. . |
| WO 98/03923 | 1/1998 | WIPO . |
| WO 98/06055 | 2/1998 | WIPO . |
| WO 98/19259 | 5/1998 | WIPO . |
| WO 98/24036 | 6/1998 | WIPO . |
| WO 98/24050 | 6/1998 | WIPO . |
| WO 98/40823 | 9/1998 | WIPO . |
| WO 98/49813 | 11/1998 | WIPO . |

OTHER PUBLICATIONS

Information Entrepreneur, Aug. 1995, pp. 14–15, "A Database on Paper".

H. Burke Handbook of Bar Coding Systems, (Van Nostrand Reinhold Co. Inc. 1984), pp. 1–17, 26–38.

W. Erdei, Bar Codes (McGraw Hill, Inc. 1993), pp. 1–28.

*Primary Examiner*—Daniel H. Pan
*Attorney, Agent, or Firm*—Anthony R. Barkume, P.C.

[57] ABSTRACT

A system and method for using identification codes found on ordinary articles of commerce to access remote computers on a network. In accordance with one embodiment of the invention, a computer is provided having a database that relates Uniform Product Code ("UPC") numbers to Internet network addresses (or "URLs"). To access an Internet resource relating to a particular product, a user enters the product's UPC symbol manually, by swiping a bar code reader over the UPC symbol, or via other suitable input means. The database retrieves the URL corresponding to the UPC code. This location information is then used to access the desired resource.

41 Claims, 5 Drawing Sheets

U.S. PATENT DOCUMENTS

| | | | |
|---|---|---|---|
| 5,420,403 | 5/1995 | Allum et al. | 235/375 |
| 5,420,943 | 5/1995 | Mak | 382/313 |
| 5,519,878 | 5/1996 | Dolin, Jr. | 395/829 |
| 5,530,852 | 6/1996 | Meske et al. | 395/200.03 |
| 5,602,377 | 2/1997 | Beller et al. | 235/462 |
| 5,640,193 | 6/1997 | Wellner | 348/7 |
| 5,649,186 | 7/1997 | Ferguson | 395/610 |
| 5,671,282 | 9/1997 | Wolff et al. | 380/25 |
| 5,710,887 | 1/1998 | Chelliah et al. | 395/226 |
| 5,745,681 | 4/1998 | Levine et al. | 705/27 |
| 5,757,917 | 5/1998 | Rose et al. | 380/25 |
| 5,764,906 | 6/1998 | Edelstein et al. | 395/200 |
| 5,765,176 | 6/1998 | Bloomberg | 707/514 |
| 5,778,367 | 7/1998 | Wesinger, Jr. et al. | 707/10 |
| 5,791,991 | 8/1998 | Small | 463/41 |
| 5,804,803 | 9/1998 | Cragun | 235/402 |
| 5,815,776 | 9/1998 | Gifford | 395/200.47 |

FIG. 3
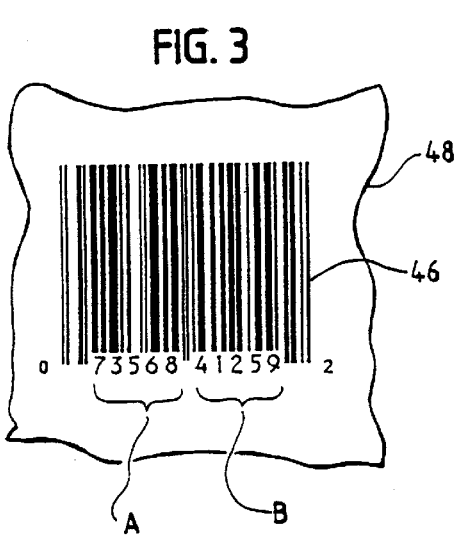
FIG. 5
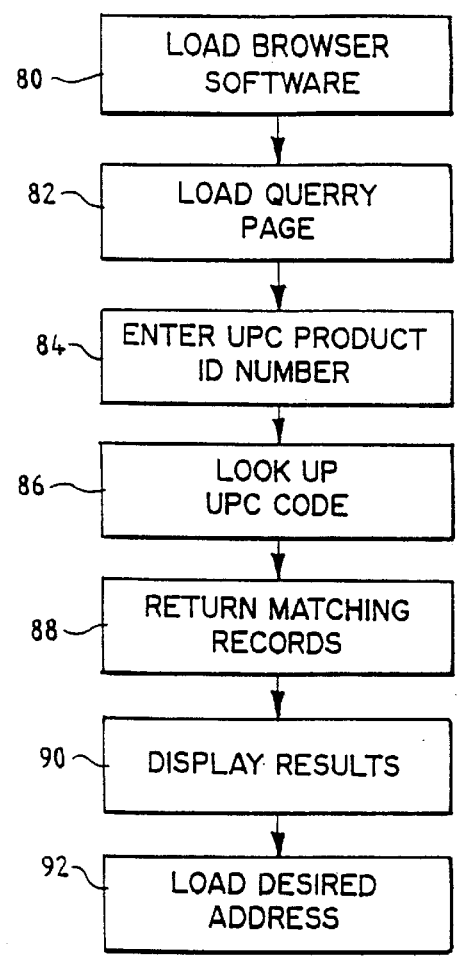
FIG. 4
| | UPC-A | UPC-B | URL | DESC |
|---|---|---|---|---|
| 62 | 31251 | 00301 | sample.soup.com/subfile/index.html | soup |
| 64 | 31251 | 00302 | sample.soup.com/promotion/main.html | giveaway |
| 66 | 31251 | 00400 | test.milk.org | milk |
| 68 | 4205 | | cars.com/testdrive/main.html | cars |

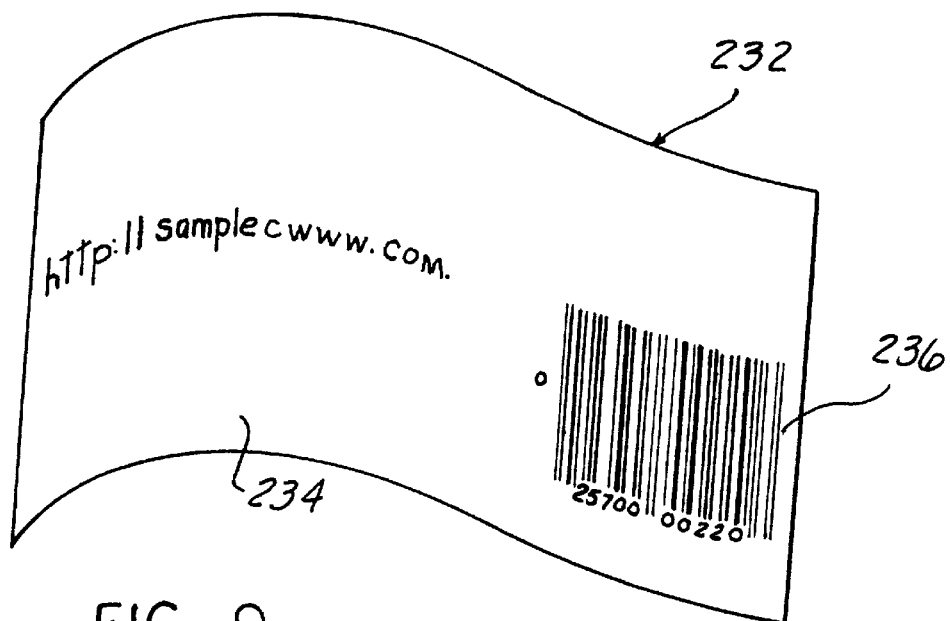
FIG·9
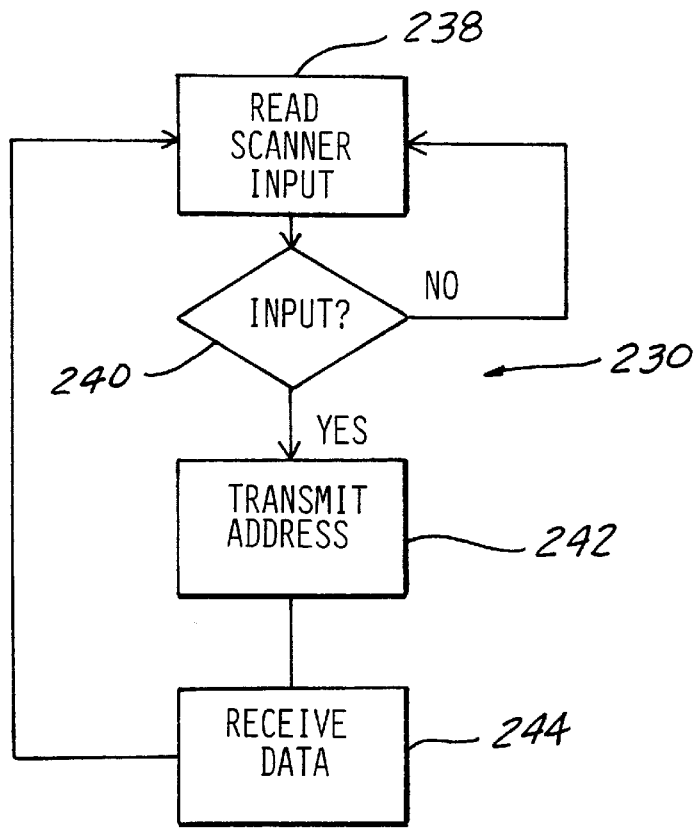
FIG-10

SYSTEM AND METHOD FOR USING AN ORDINARY ARTICLE OF COMMERCE TO ACCESS A REMOTE COMPUTER

RELATED APPLICATION DATA

A claim of priority is made in this application based on Provisional Application Ser. No. 60\000,442, filed on Jun. 20, 1995, and entitled "Method and Apparatus for Interfacing with Remote Computers" (hereinafter, "our copending application"), the disclosure of which is hereby incorporated by reference in its entirety.

FIELD OF THE INVENTION

This invention relates to computer communications generally, and more specifically to techniques for giving users convenient access to information located on computer networks such as the Internet.

BACKGROUND OF THE INVENTION

A computer network is a set of computers (or "hosts") which are able to communicate electronically. In logical terms, the network can be viewed as a set of nodes or "sites", with each computer on the network being home for one or more nodes. Generally speaking, each host is assigned a numeric address, which the network uses to route information to that particular host. To facilitate human use of networks, addresses are often given alphanumeric codes (or "mnemonics"), which are easier for people to remember. For example, the numeric address 200.98.322.56 may be assigned the mnemonic "sample.com."

At the present time, the world's most important network is the Internet. The Internet is a massive worldwide collection of computer resources, connected together in network fashion by a series of communication protocols known as TCP/IP. Many sites on the Internet can be accessed in accordance with popular standard protocols or formats such as Gopher and Hypertext Transport Protocol ("HTTP"). These sites act as remote servers, providing information to users' computers (or "clients") in accordance with a particular format or protocol. The client system (often an individual's personal computer) must have the necessary software to handle the server's particular protocol.

For example, sites set up in accordance with HTTP are nicked-named "Web sites". If a user wants to access Web sites, she must have a computer connected to the Internet and equipped with software for communicating in accordance with the HTTP protocol. Such software is often called a "browser," because it allows users to browse (or, in the parlance of the enthusiasts, "surf") from Web site to Web site, much the way one might browse through a library. This process is facilitated by the fact that most Web sites have hypertext links to other Web sites, which the user can activate by clicking a mouse on a highlighted portion of the screen.

Typical browser software also maintains a list of sites the user has visited, which the user can recall using commands such as "back" and "forward." These commands, coupled with the hypertext links between Web sites, give users the sensation of "navigating" through a seemingly infinite realm of information, which is popularly referred to as "cyberspace" or the "World Wide Web."

Users can also specify a Web site by manually typing in the site's location as a Uniform Resource Locator ("URL"). The URL specifies the precise location of a particular resource, and has three fields:

<resource type> <domain name> <path>

Domain name, as explained above, is the alphanumeric network address of the host on which a particular resource resides. The "path" is the specific directory and file on the host where a resource is stored. A typical URL is http://bongo.cc.utexas.edu/~neural/cwsapps.html.

For example, the command "Go <URL>" would cause browser software to request the information residing at the site specified by the URL. This is called "pointing" the browser to the desired Web site. The Web server at the designated URL processes the browser's request by transferring a copy of the file specified by the URL to the user's local host computer. The transferred file includes embedded commands in the hypertext markup language ("HTML"), which cause the client's browser software to display and handle the transferred file in a desired manner.

Cyberspace is not limited to the World Wide Web or the Internet. Massive amounts of information are also available on networks maintained by on-line service providers under the service marks CompuServe, Prodigy and America Online, for example. Users typically access these on-line services via telephone modem connection. To the end user, these networks appear to be a series of sites or locations or "rooms" offering various types of information. The addresses for these locations are assigned by the on-line service providers. Navigation among these locations is handled by proprietary client software, which runs on the user's personal computer.

Many users learn of resources on the Internet or a proprietary on-line service through magazine articles and advertisements. These articles and advertisements include the necessary URL or other network address to access the desired site. Many publications compile lists of sites they deem particularly worthwhile. When a user sees a listing for a site which looks interesting, he can manually enter the published URL or other mnemonic address into his browser or other software, and access the site.

As explained in our copending application, we realized that published computer addresses—whether URLs or otherwise—were difficult for people to use because they have to be tediously entered into their computers. A good example of an address which may be difficult to enter is the University of Texas address cited above. The problem is particularly acute for persons with a visual or physical disability.

Another problem using the Internet, we realized, is that many users have trouble even finding URLs or other network addresses for desired sites such as Web pages. Accordingly, Web site sponsors publish their Web site URLs in print advertising and on packaging. The difficulty with this approach however is that the URLs are still long, and cumbersome to remember and enter into a computer.

In our copending application, we proposed to resolve these problems by allowing people to access published locations without having to manually enter the published address. In accordance with one embodiment of the invention, disclosed in our court pending application the mnemonic address or verbal description of a network location is published along with the location's numeric address in bar code format. The user's computer is equipped with a bar code reader and browser software. The bar code reader is suitably interfaced to the computer's browser software to allow bar code input to be accepted as address information. When the user sees an interesting published address, he scans the associated bar code using the bar code reader, thereby loading the desired numeric address into the browser. The browser then accesses the Web or other site corresponding to that numeric address.

We are finding several problems with this and other approaches that have been tried. First, some URLs and other network addresses contain upwards of 20–30 characters, and therefore require very long bar code symbols, which can clutter advertising and packages, and may not be practical from either an esthetic or technical perspective. Second, placing URLs on printed material (whether or not in bar code format) requires manufacturers to redesign products, packaging and/or advertisements, and many manufacturers may be reluctant to do this. Third, pervious proposal, if the network address is changed, the package needs to be redesigned, and packages already in the marketplace will have incorrect address information.

SUMMARY OF THE INVENTION

The present invention offers a better way for consumers and others to access resources on remote computers, particularly Web sites. In accordance with one aspect of the invention, the dissemination and entry of network addresses is accomplished by means of existing identification standards (e.g., bar codes) found on ordinary products like soup or soda, in conjunction with a centralized database of network locations.

One embodiment of the invention is a system in which a bar code or other indicia is associated with a product or other article of commerce. The indicia encodes (in human and/or machine readable form) a UPC or other identification number, which is associated with the article in accordance with an extrinsic standard. A computer database is provided that relates standard UPC codes to Internet URLs or other network addresses. To access a network resource relating to a particular product, the user swipes a bar code reader across the product's UPC symbol. The database then retrieves the URL corresponding to the UPC product data. This location information is then used to access the desired resource on the network.

In accordance with another aspect of the invention, network addresses are directly encoded into bar code format. In this manner, the necessity of manually entering the address is eliminated. Users can more quickly review published lists of Web Sites or other locations. The bar coded address can also be printed on removable stickers or detachable cards, allowing users to readily clip the stickers or cards for future reference.

In accordance with yet another aspect of the invention, navigational commands (in addition ton addresses) can be published together in both human-readable and bar code formats. These commands include common commands such as "back" and "forward," as well as more specialized command sequences, such as the commands necessary to access particular services, files, and documents on the Internet or the proprietary on-line services. Rather than manually enter these commands, the user selects a desired command by scanning its associated bar code. The output of the bar code reader is accepted by the browser software as the selected command.

The invention offers a number of important advantages. First, because product identification information is already widely disseminated using standardized and pre-assigned codes, the invention eliminates the need for separately disseminating domain names or other network location data. Further, the invention can be implemented without requiring manufactures to redesign packaging or other articles, or to develop special bar code indicia. This overcomes a Catch-22 often facing new technologies: manufacturers will not participate until there is widespread consumer interest; consumers are not interested until there is widespread manufacturer participation. With the invention, mass participation by manufacturers in the technology is automatic.

Second, the invention allows practical use of bar codes and other machine readable media for entry of network location data. As we realized, encoding URL data in bar code format is not practical because the resulting bar codes are too long. By using existing UPC product codes in combination with the database of network locations, users have the benefit of bar code or comparable technology for entering network location data. Thus, the necessity of manually entering the address is eliminated. Users can access a desired site by simply using a bar code reader. The UPC can also be printed on removable stickers or detachable cards, allowing users to readily clip the stickers and cards for future reference. This is particularly useful when the user reads about the location at a time when he does not have access to a computer.

Third, the invention overcomes the problems encountered when network addresses are changed. Network addresses can change as companies reorganize their on-line marketing strategies. Also, Internet addresses are assigned by an independent third party—InterNic—which may in some cases have the authority to unilaterally change a company's address. Finally, unforeseen trademark conflicts (involving for example Internet domain names) may require adoption of new addresses. With the invention, a new address assignment requires only that the database of addresses be updated. Products, packaging, advertisements and the like bearing the standard identification codes need not be redesigned.

BRIEF DESCRIPTION OF THE DRAWINGS

FIG. 3 is an enlarged view of the article of commerce shown in FIG. 1, illustrating in detail the UPC symbol thereupon.

FIG. 4 is a tabular view of the database shown in FIG. 1.

FIG. 5 is a flow chart illustrating the operation of the system of FIG. 1 in accordance with the invention.

FIG. 9 is an idealized perspective of the document of FIG. 8 having a network address in both bar code and human readable formats.

FIG. 10 is a flow chart illustrating the operation of the apparatus of FIG. 8 in accordance with the invention.

DETAILED DESCRIPTION OF THE PREFERRED EMBODIMENT

1. Overview

Figure 1:
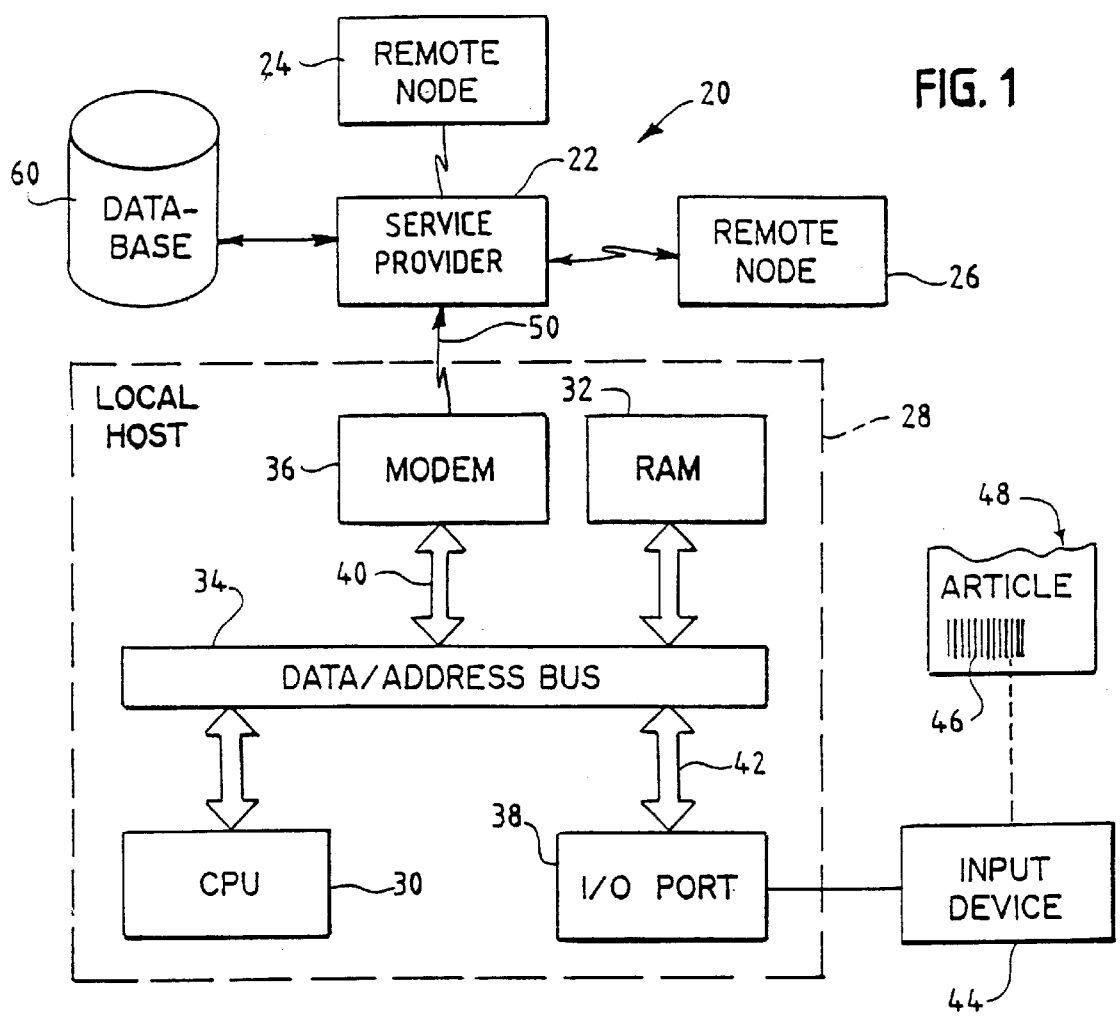
FIG. 1 is a block diagram of a computerized system for interfacing with a computer network in accordance with the invention.

FIG. 1 is a block diagram illustrating one application of the invention, namely the use of an ordinary article of commerce to access sites on the Internet's World Wide Web. As explained below, this embodiment of the invention allows a person who desires Internet resources concerning a particular product to access those resources using the product's UPC symbol. The data encoded on the UPC symbol can be entered manually or (for greater convenience) using a bar code reader.

Referring to FIG. 1, the Internet 20, illustrated here in generalized format, includes a service provider 22 and two remote nodes 24 and 26. In this case, service provider 22 is a local Internet access provider. Service provider could also be an online service provider, such as America OnLine®, Compuserve®, Microsoft® Network and Prodigy®. In such cases, local host 28 need not be on Internet 20—that is, need not have a network address.

An end-user (not shown) accesses Internet 20 using local host 28, which in this case is an IBM compatible personal computer including a CPU 30, a random access memory 32 and an address/data bus 34 by operatively connecting CPU 30 and memory 32. Unless otherwise specified, the term "memory" herein includes any storage device, including RAM, ROM, tape or disk drives (or collections or networks of tape or disk drives), and any other device for storing information. A modem 36 and I/O port 38 are attached to bus 34 by a suitable interfaces 40 and 42, respectively. An input device 44 is connected to bus 34 via I/O port 38. Input device 44 is a commercially available wand-style bar code reader reads a Uniform Product Code ("UPC") bar code symbol 46 affixed to an article of commerce 48. Alternatively, input device 44 could be a card reader, optical character or voice recognition system, touch screen, scanner, pen, keyboard or other known input device.

Local host computer 28 need not be a personal computer, and could for example be a mainframe or minicomputer having a terminal by which the user could enter and receive data. In that arrangement, input device 44 would be attached to the terminal.

Figure 2:
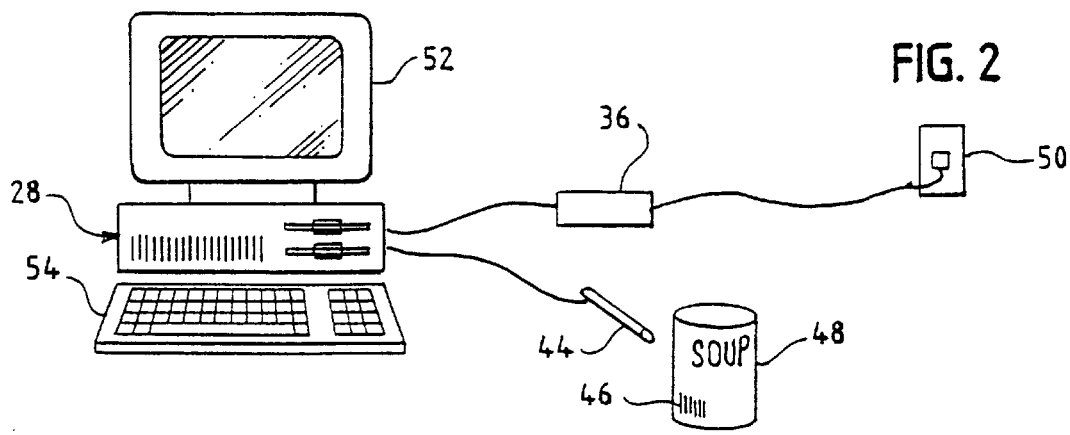
FIG. 2 is a perspective view of the local host computer shown in FIG. 1.

Modem 36 is adopted for electronic communication via a suitable telephone link 50 with service provider 22. Computer 28 functions as an Internet host because it is connected to service provider 22 using Point to Point Protocol ("PPP") via telephone link 50. Other telecommunications channels may be used, such as ISDN or a connection which incorporates a third party intermediary network such as Tym-Net$^{sm}$. Alternatively, local host 28 could be connected directly to Internet 20, as is likely to be the case where local host 28 is a larger computer, such as mainframe. FIG. 2 offers a perspective view of local host 28 and article of commerce 48 and also illustrates a CRT monitor 52 and keyboard 54 suitably coupled to bus 34.

In this illustration, local host 28 is used to access Internet resources (or "Web sites") on remote nodes 24 and 26, which are available using the HTTP protocol. HTTP uses a client-server architecture, with remote nodes 24 and 26 acting as servers, and local host 28 acting as a client. Local host is equipped with Netscape Navigator brand Web browser software which enables it to function as an HTTP client.

Remote notes 24 and 26 have pre-assigned network locations (or "domain names"), and desired resources (such as a particular Web site) are located in specific directories and files (or "paths") resident on a remote nodes 26 and 28. The precise locations of those resources are specified using URL, which, as explained above, includes three fields: <resource type> <domain name> <path>. To access resources of a particular remote node 24 or 26, local host 28 requests those resources from Internet 20 using the appropriate URL. Thus, the URL functions as a more precise kind of network address than a domain name.

The URL required is often supplied by the user. Users learn about the existence of a desired resource (and its corresponding ULR) through a variety of means, including publication in a printed advertisement. In current practice, the URL acquired from a printed source must be entered using a keyboard. As explained above, this can be tedious. Moreover, in many cases, users may have trouble finding references to desired Web pages.

2. Article of Commerce

In accordance with the invention, access to desired resources on remote nodes 24 and 26 is achieved using an article of commerce 48. The term "article of commerce" includes tangible things that are sold or moved through commerce, such as consumer products, packaging, and printed media including books, newspapers, magazines, stickers, fliers, cards, tags and labels. Article 48 bears a standard UPC bar code symbol or indicia 46. Symbol 46 is shown in greater detail in FIG. 3, and may be affixed to article 48 in any suitable manner, including printing directly on the article or its packaging, or applied to labels or tags attached or otherwise affixed to the article. In accordance with UPC standards, symbol 46 encodes a ten-digit number (the "product identification number"). As shown in FIG. 3, the product identification number encoded in UPC symbol 46 consists of two five-digit fields, A and B. Field A is a unique, pre-assigned number signifying a particular manufacturer. Field B is a number identifying one of the manufacturer's products. In the United States, UPC product identification numbers are assigned by the Uniform Code Council, Inc.

UPC symbol 46 provides a machine-readable number that uniquely identifies a particular product and its manufacturer. This is useful at the retail point-of-sale, where purchase of a particular item is recorded by scanning the item's bar code symbol.

There are numerous other formats and systems for assigning product identification numbers to articles of commerce. For example, the International Article Numbering Association ("EAN") assigns its own number to products outside of the U.S. and Canada, and uses a different symbology than used with the UPC. Product identification codes for books are provided by the International Standard Book Numbering System ("ISBN") and are encoded using a symbology specified by that organization. Likewise, magazines and serial publications are assigned product identification codes by the International Standard Serial Numbering System ("ISSN").

These numbering systems share at least three characteristics. First, for purposes of this invention, the identification numbers may be assigned in accordance with an "extrinsic" standard. By extrinsic, it is meant that the assignment of numbers is made a by group or association for the purpose of identifying articles of commerce. It is likely that new types of identification numbers will arise in the future, as will new organizations for assigning and administering those numbers, and the present invention contemplates use of both existing and future extrinsic identification numbers and formats.

Second, the identification numbers may have recognized significance as numbers identifying articles of commerce. The level of recognition may be among the general public, or a defined subset, such as a particular industry or occupation.

Third, the identification numbers may be encoded in a standard, machine readable format—namely, bar codes. Other machine readable formats may also be used for this purpose, including magnetic stripes or optical character recognition ("OCR"), and the present invention could be practiced with product identification numbers encoded in those formats as well.

3. URL/UPC Database

In accordance with the invention, service provider 22 includes a relational database 60, which is shown in more detail in FIG. 4. Database 60 includes records 62–68, which are accessible using a suitable database management system software. Each record 62–68 of database 60 contains four fields 70–76. Fields 70 and 72 contain a UPC product identification number, as explained below. Field 74 holds a URL suitable for locating a resource on the Internet. Depending on the application, other network addresses— either numeric or mnemonic, physical or virtual—may be used. Field 76 holds a narrative description of the resource addressed in field 74. This particular arrangement of fields is but one illustration of how the invention may be practiced. For example, additional fields could be provided, or the UPC product identification number could be held in a single field.

Each record 62–68 of database 60 associates a UPC product identification number (contained in fields 70 and 72) with a particular Internet URL and narrative description (contained in fields 74 and 76, respectively). The association is based on selected criteria. In this case, the criteria is the existence of a Web resource sponsored by the manufacturer of the product identified by the UPC number in fields 70 and 72. (If no such resource exists, then the particular product identifier can be omitted from database 60). Other criteria can be used. For example, the association could be based on the existence of a Web site simply referring to or relating to the product.

As stated, fields 70 and 72 contain a UPC product identification number. Field 70 contains the first five digits of the product identification number (field A of FIG. 3). As explained above, these digits uniquely identify the product's manufacturer. Field 72 contains the second five digits of the product identification number (field B of FIG. 3). These digits identify the manufacturer's particular product. In some cases, a manufacturer may have many products and only one Web site or other Internet resource. In that case, field 72 may be left blank, as shown in cell 78 of record 68. When field 72 is left blank, database 60 associates the Web resource indicated in field 74 with any product identification number whose first five digits match the manufacturer number specified in field 70.

Database 60 itself is accessible via service provider 22, which is equipped with Web server software such as provided by Netscape Communications, Inc. The server software provides access to an HTML document (the "Query Page") resident on service provider 22 at a predetermined URL. The Query Page, when displayed on CRT 52 by local host 28 using a forms-capable browser allows the user to enter a query in the form of a UPC product identification number. Alternatively, database 60 could be resident on local host 28 or another remote computer 24 or 26. The Web server at service provider 22 may have a predetermined URL location. Browser software resident in local host computer 28 may be configured to automatically request that predetermined URL location when the browser software is initially loaded.

Database 60 may be incorporated with a database or search engine of Web sites or other Internet resources (such as the Yahoo or Lycos databases). In that case, the Query Page may give the user the option of entering a UPC number or an alternative search term, such as a portion of the URL or the topic to which the desired resource pertains.

Also, database 60 may be divided into one or more tables, which may be distributed over more than one computer. For example, a first table may contain records associating UPC numbers with names of products or manufacturers. A second table associates products and/or manufacturer names with Internet addresses. Thus, the process of using the UPC number to locate a network address may involve one or more steps. For example, database 60 might determine the name of a product corresponding to a UPC number using a first table, and then determine network addresses corresponding to that product name using a second table. Even though multiple steps are involved, the UPC number is still "associated" in computer memory with the network address for purposes of the invention.

4. Operation of the Invention

Suppose a user is interested in Internet resources concerning a particular type of product. In accordance with the invention, the user can access those resources by taking an ordinary specimen of the product—a can of soup for example—and entering all or part of the product's UPC product identification number 46. Database 60 uses the entered product identification number to look-up the associated URL, which is returned to the user in the form of a HTML document.

This operation is illustrated in FIG. 5. At a block 80, the user loads his browser software onto local host computer 28. The browser software is programmed to automatically load the "Query Page" which provides access to database 60. The user in this case is a human, but alternatively a program (or "process") running on local host 28 could be the "user" in the sense that it is the process which is requesting information from the Internet and supplying the UPC number.

At a block 82, the Query Page is transmitted to local host computer 28 in the form of an HTML document. Browser software resident on local host 28 displays the Query Page on CRT screen 52. At block 84, the user (or process) enters the first five or all ten digits of the UPC product identification number encoded by symbol 46. Because the UPC product identification number is printed in both machine- and human-readable format (See FIG. 3), this may be done by manual entry using keyboard, voice recognition system or other input device. More preferably, however, entry is accomplished by scanning UPC symbol 46 affixed to article 48. Input device 44 reads UPC symbol 46, and generates an ASCII character string which is read by CPU 30 via I/O port 38. If the UPC number is scanned, then all 10 digits will generally be entered. The UPC product identification number is transmitted to the Web server resident on local service provider 22, which at a block 86 looks up the entered UPC number in database 60.

At block 88, database 60 retrieves all records 62–68 having UPC fields 70 and 72 that match the product identification number entered by the user. The records are conveyed to the user in the form of an HTML document. The criteria at block 88 for whether UPC fields 70 and 72 "match" the product identification number may be based on a "query by example" approach. For example, suppose at block 84 the user only enters the manufacturer portion (e.g. "31251") of a product identification number. It is assumed in this case that the user is interested in any record 62–68 having a field 70 that matches the entered manufacturer portion. (Recall that the database 60 stores the UPC number in two fields—field 70 for the first five digits (corresponding to manufacturer) and field 72 for the second five digits (corresponding to manufacturer's product)). Thus, at block 88, records 61, 64 and 65 are returned to the user, because field 70 in each of those records contains "31251."

If the user entered all ten digits of a UPC product identification number(e.g., "31251-00302"), then only records whose fields 70 and 72 matched "31251" and "00302," respectively, would be retrieved. (In this case, that would be record 64). If all ten UPC digits are entered, and no exact match is found, database 60 may be programmed to retrieve records (if any) where at least the manufacturer portion (that is, first five digits) matches field 70.

Figure 6:
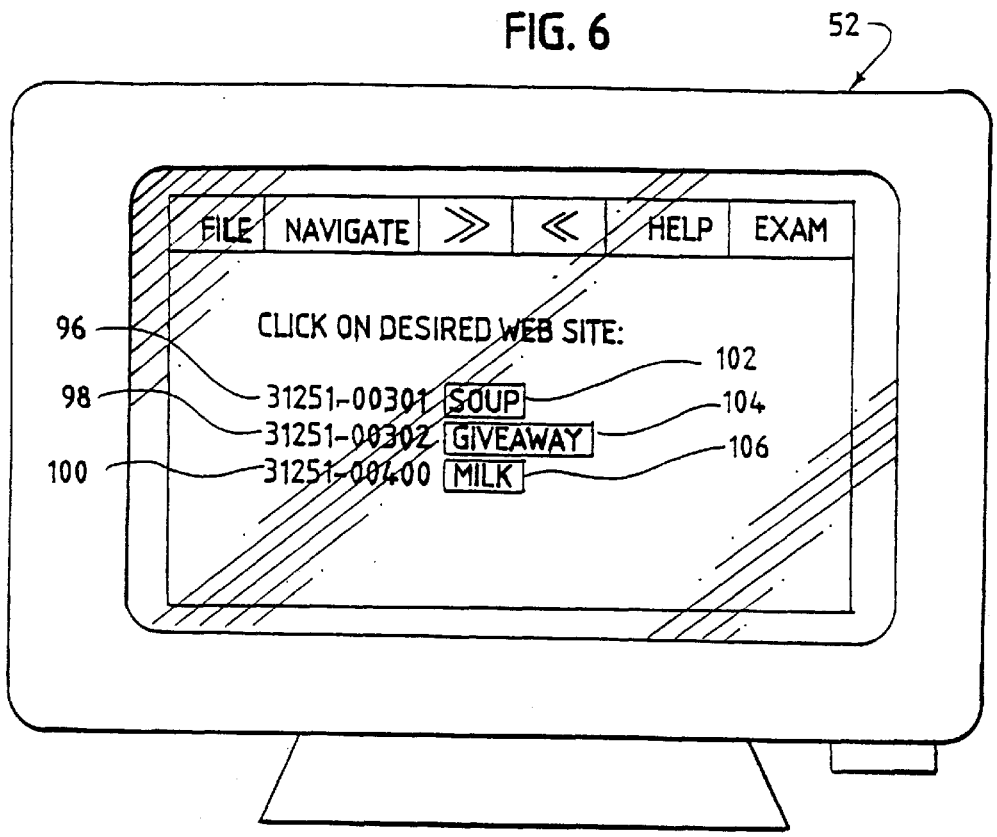
FIG. 6 is an idealized view of the CRT screen of the client system of FIG. 1 displaying information in accordance with the invention.

At block 90, browser software on local host computer 28 displays records retrieved at block 88 on CRT 52. The records are returned in an HTML document, which is displayed by the browser in a screen format 94, as illustrated in FIG. 6. In this example, records 62, 64 and 66 have been retrieved. Screen format 94 displays data from each record in a separate rows 96, 98 and 100, respectively. If no matching records are found at block 88, a message such as "no records found" may be returned instead.

Text from description field 76 of each of records 62, 64 and 66 is displayed as hypertext links 102, 104 and 106, respectively. Link 102 is associated with the URL of record 62, link 104 with the URL of record 64, and link 106 with the URL of record 66. When the user selects one of links 102–106 (by mouse click or otherwise), the browser software loads the URL associated with the selected link to access the resource at the location specified by that URL.

5. Alternative Embodiments

The foregoing embodiment is just one example of the present invention. Many alternatives are possible.

Other Networks and Protocols. While the present invention is illustrated with respect to a system for accessing the Internet's World Wide Web, it could be practiced using other Internet protocols (such as Gopher) or other types of wide area networks and systems, including those offered by "on-line service" providers such as America OnLine® of Fairfax, Va. or CompuServe® of Columbus, Ohio or the Microsoft® Network of Redmond, Wash.

In those cases, database 60 could be resident on the on-line service provider's computer. The network address information contained in database 60 could be either Internet URLs, or locations within the on-line service provider's environment. In this case, the protocol used to communicate between local host 28 and service provider 22 need not be HTTP or other Internet protocol. However, service provider 22 can provide a gateway to Internet 20, and access to a desired network location on the Internet can be made using a URL retrieved from database 60.

Controlled Access. Database 60 need not be publicly accessible. Access to database 60 can be limited either by placing database 60 on a proprietary network, or, if placed on an open network, using a password or digital signature system to permit access only to authorized persons. Also, records 62–68 may be selectively accessible. For example, each record can contain an additional field indicating whether the URL contained in field 74 points to network location containing material inappropriate for children. In that case, database 60 can be programmed to return URL at block 88 only if the user has supplied a proper password.

Automatic Jumping to Desired Location. In the disclosed embodiment, the URL associated with a selected UPC product identification code is returned to the end user in an HTML document at block 88 of FIG. 5. The user can then hypertext link to the site corresponding to the URL. Alternatively, instead of displaying query results at step 90 (of FIG. 5), browser software in local host can automatically load the retrieved URL and point the user to the site corresponding to that URL. An additional field in database 60 can provide a code indicating whether this feature should be enabled or disabled for a particular URL.

Identification Numbers and Symbologies. The invention can be practiced using standard identification numbers and symbologies other than UPC numbers and formats. For example, EAN, ISBN and ISSN numbers and formats discussed above could be used.

Figure 7:
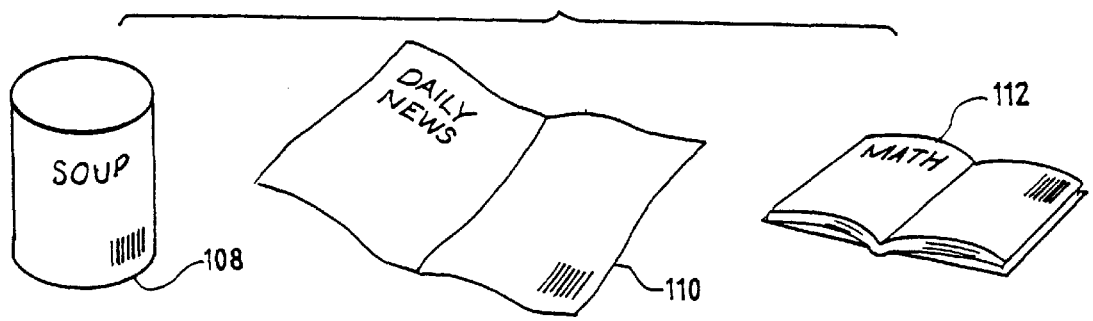
FIG. 7 is a perspective view of articles of commerce which can be used in accordance with the invention to access remote computers.

Articles of Commerce. As shown in FIG. 7, product identification numbers—whether bar coded or otherwise—may be placed all types of items, such as a consumer product 102, newspaper 104 or book 106, as well as coupons, fliers, cards and advertisements (not illustrated). For example, by placing a product's UPC code on an advertisement for the product, the advertiser could, in accordance with the invention, facilitate access to Internet resources concerning the product.

Machine Reading Technology. In lieu of a bar coding, the invention could be practiced with product identification information that is encoded using other technologies. For example, product identification information could be encoded on a magnetic strip affixed to a product, card or other article. In place of wand, local host computer could use a magnetic card reader. Alternatively, the number could simply be printed in human-readable format, and an optional optical character recognition system could be used to facilitate entry.

Direct Coding of Address. In place of a standard UPC symbol, bar code technology could be used to encode the actual mnemonic or numeric (IP) network address in machine-readable format. While this arrangement does not achieve al the advantages of the invention, it allows the user to easily enter desired address information using a bar-code reader instead of manually typing the address.

Figure 8:
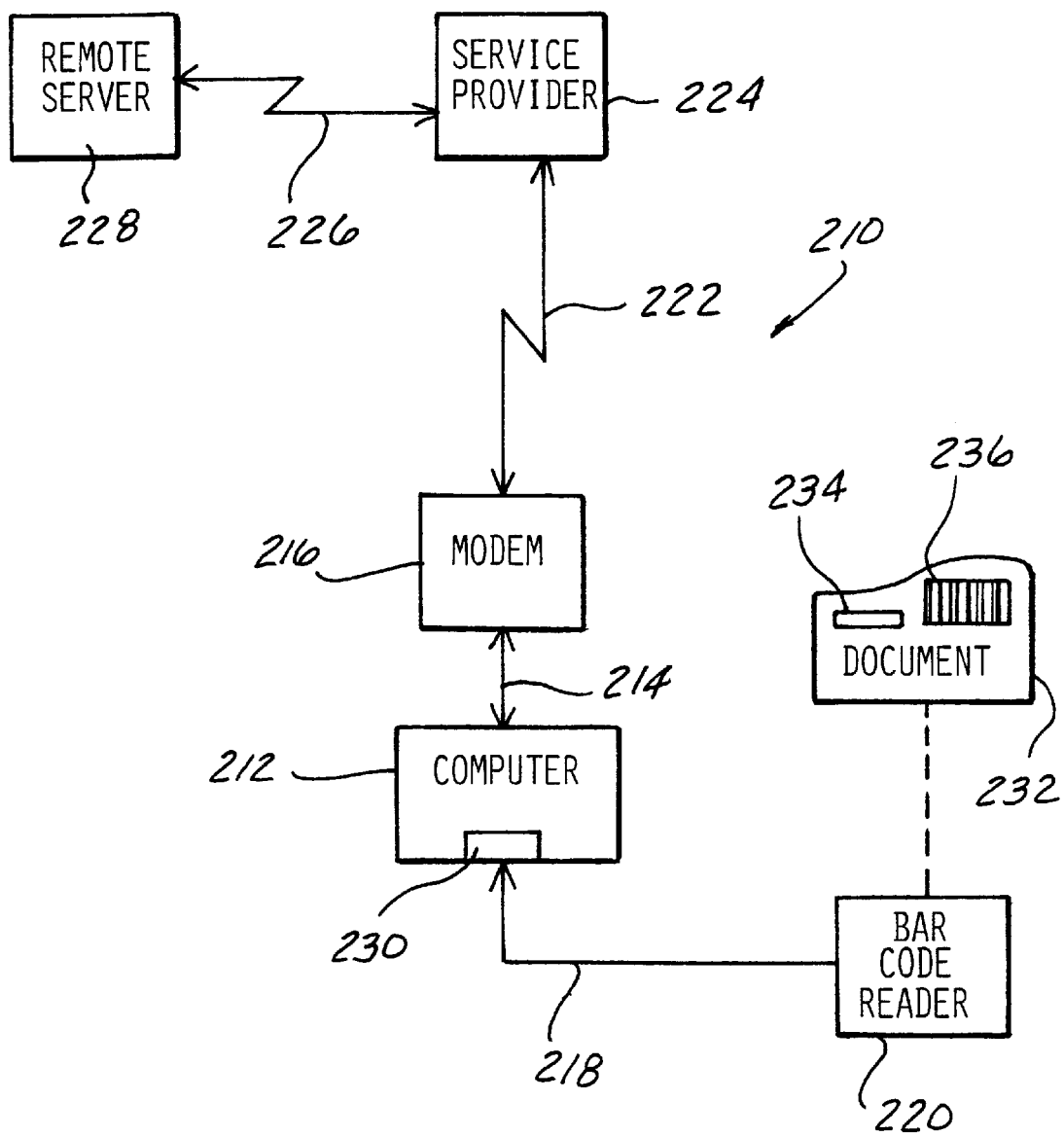
FIG. 8 is a block diagram of a computerized apparatus for interfacing with a computer network in accordance with a second embodiment of the invention.

An example of the direct coding of network addresses is shown in the embodiment illustrated in FIGS. 8–10. Referring to FIG. 8, a block diagram of the computerized apparatus 10 for interfacing with a computer network in accordance with the invention is illustrated. Apparatus 113 includes a computer 114 which may be an IBM compatible personal computer. Attached to computer 114 by a suitable input/output interface 115 is a modem 116. Also attached to computer 114 via an input/output interface 118 is a bar code reader 120. Bar code reader 120 is designed to read conventional bar codes. Bar code technology is described generally in U.S. Pat. No. 5,115,326 issued May 19, 1992 and entitled "Method of Encoding an E-Mail Address in a Fax Message and Routing the Fax Message to a Destination and Network", and U.S. Pat. No. 5,420,943 issued May 30, 1995 and entitled "Universal Computer Input Device," the disclosures of which are both hereby incorporated by reference.

Modem 116 is adopted for electronic communication via a suitable telephone link 122 with a service provider 124. Service provider 124 may be an Internet service provider or a proprietary on-line service such as Prodigy or America On-Line. Service provider 124 in turn is electronically connected by a suitable communication link 126 to a remote server 128. For purposes of illustration, we assume that remote server's 128 numeric network address is 200.98.154, and that the assigned address mnemonic is http://sample@www.com.

Computer 114 is equipped with communication software for establishing and maintaining a communication link with service provider 124 via modem 116 and telephone link 122. Computer 114 is also equipped with software (see FIG. 10) such as Netscape Navigator brand Web browser software (version 1.0) which enables it to request and receive information from remote server 128 via service provider 124. To operate software 130, a user (not shown) enters an alphanumeric address such as sample@www.com. Browser software 130 sends service provider 124 a request for the information contained at address corresponding to the mnemonic sample@www.com. As explained above, that mnemonic address belongs to remote server 128.

Using the address sample@www.com, service provider 124 routes the request to remote server 128 via communication link 126. Remote server 128 responds by sending the desired information via communication link 126 to service provider 124, which relays the information to computer 114 via modem 116 and telephone link 122. Once the information is received by computer 114, browser software 130 displays the information in a useful format for the user.

In accordance with the invention, a document 132 is provided. Document 132 may be magazine article, advertising or other printed matter. As shown in FIG. 9, Document 136 contains human readable information 134 about resources available at a location on a network such as the Internet, including resources provided by remote server 128. In this example, human readable information 134 includes remote server's 128 mnemonic address—http://sample@www.com. A bar code indicia 136 is placed near human readable information 134. Bar code 136 contains remote server's 128 numerical address (200.98.154) in machine readable form.

Alternatively, bar code 136 could contain a machine readable version of the mnemonic address. Under that arrangement, the bar coded digits would correspond to alphanumeric symbols of the mnemonic address. For example, the bar coded number "97" could correspond to the character "a". In that case, however, bar code 136 may have to be exceptionally long.

If the user wants access remote server 128, he or she scans bar code 136 using bar code reader 120. Bar code reader 120 generates a signal on input/output interface 118 corresponding to the numeric address encoded by bar code 136 (which for purposes of illustration we assume to be 25700-00220, as shown in FIG. 9). Browser software 130 on computer 114 reads the numeric address via input/output interface 118, and forwards it to service provider 124, along with a request for information contained at the location corresponding to that address. Service provider 124 determines that the numeric address is that of remote server 128, and routes to there the request for information.

Referring to FIG. 10, the operation of browser software 130 is shown in more detail. In an initial step 138, browser software attempts to read input from bar code reader 120. At a decision block 140, browser software 130 determines whether reader 120 has input. If no input is available, control returns to block 138, where browser software 130 again attempts to read bar code reader 120. If input is available at decision block 140, then control moves to a block 142 where browser software 130 transmits the input read at block 138 to service provider 124. There are other ways to handle input from bar code reader 120, and more sophisticated techniques may be used in actual commercial embodiments of the invention.

Service provider 124 interprets the input as a numeric network address. In this case, we have assumed that the address is that of remote server 128. Service provider forwards a request for data to remote server 128. At a block 144, the requested data contained on remote server 128 is received by browser software 130 via service provider 124. Once received, the data is available for whatever use required by the user. Control then returns to block 138 where the foregoing process is repeated indefinitely.

In effect, the necessity of manually typing in the mnemonic address sample@www.com is eliminated. Instead, the numeric address is obtained from the bar code indicia 136 by use of bar code reader 120. As explained above, bar code 136 could contain the mnemonic as well as numeric address. Browser software could be programmed to accept either format (mnemonic or numeric) as input from bar code reader 120, with the default expectation being that the bar coded data is a numeric address unless the user otherwise specifies. Alternatively, the first coded number of bar code 136 could indicate whether the information that follows represents a numeric or mnemonic address. If bar code 136 can contain either mnemonic or numeric addresses, then browser software should include a flag or other indication alerting service provider 124 as to the format of the transmitted data.

The foregoing embodiment is just one example. Many alternatives are possible. For example, in lieu of a bar code scanning device, a card reader could be employed. The card reader would read a magnetic stripe affixed to a card or other printed matter. The card would contain human-readable information about a network resource, and the magnetic strip would contain the resource's numeric or mnemonic address in machine-readable format. Alternatively, a RF data collection scanner or CCD scanning system could be used. Bar code symbol 126 could also be associated with specific commands such as "forward", or "back," or command sequences used to access information.

We claim:

1. An apparatus for using an article of commerce to access a remote computer, comprising:
    (a) a machine-readable indicia associated with the article of commerce, said indicia encoding at least one of a plurality of identification numbers, said encoded identification number corresponding to the article in accordance with an extrinsic standard;
    (b) an input device generating a signal corresponding to said encoded identification number; and
    (c) a database containing a plurality of network addresses and said plurality of identification numbers, each of said identification numbers being associated with at least one of said plurality of network addresses; said database being responsive to said signal for providing one of said network addresses which is associated with said encoded identification number;
further comprising a local host adapted for network communication; and a first network containing a plurality of nodes, each having an assigned network address; said network being operatively coupled to said local host for allowing communication between said local host and that one of said nodes whose assigned network address corresponds to the network address provided by said database.

2. The apparatus of claim 1 where said machine-readable indicia is a bar code, and wherein said input device includes a bar code reader.

3. The apparatus of claim 2 where said identification number is at least a portion of a Universal Product Code.

4. The system of claim 2 wherein said identification number is at least a portion of a EAN code.

5. The apparatus of claim 1 wherein said indicia includes human-readable elements, and wherein said input device includes a keyboard for manually entering said identification number.

6. The apparatus of claim 1 wherein said local host is a multi-user computer with a plurality of user terminals.

7. The apparatus of claim 1 wherein said local host is a single-user computer.

8. The apparatus of claim 1 further comprising a server, wherein said local host computer is remotely connected to said server and wherein said database is resident on said server.

9. The apparatus of claim 8 wherein said communication between said local host and said one of said nodes is carried through said server.

10. The apparatus of claim 1 wherein said database is resident on said local host.

11. The apparatus of claim 1 wherein said database is resident on one of said nodes that is remote from said local host.

12. An apparatus for using an article of commerce to generate the network address of a computer on a network, comprising:

(a) means for generating a signal corresponding to an article identification number which is used to identify the article of commerce in accordance with a standard that specifies the length of the identification number;

(b) a database having a plurality of identification numbers including said article identification number and a plurality of network addresses, and associating each of said identification numbers with at least one of said network addresses; and (c) control means responsive to said signal and operatively coupled to said database for retrieving from said database at least one of said network addresses which correspond to said article identification number;

further comprising a local host in communication with said database to receive the network address provided by said database;

further comprising a network including a plurality of nodes, each associated with one of said plurality of network addresses; wherein said local host is adapted for communicating with one of said nodes using said network address generated by said database.

13. The apparatus of claim 12 wherein said identification numbers are Universal Product Codes.

14. The apparatus of claim 12 wherein said network addresses are Uniform Resource Locators.

15. The apparatus of claim 12 further comprising a remote host adapted for network communication, wherein said reader for generating said signal is resident on said local host, and said database is resident on said remote host.

16. The apparatus of claim 12 wherein said identification numbers are EAN codes.

17. The apparatus of claim 12 wherein said means for generating said signal includes a bar code scanner.

18. The apparatus of claim 12 wherein said means for generating said signal includes a keyboard.

19. The apparatus of claim 12 wherein said local host is a multi-user computer.

20. The apparatus of claim 12 wherein said local host is a single-user computer.

21. The apparatus of claim 12 wherein said means for generating said signal is coupled to said local host so that said signal is communicated to said database through said local host.

22. In an apparatus comprising means for generating a signal corresponding to a product identification number which is used to identify the article of commerce bearing an indicia on which said product identification number is encoded in accordance with an extrinsic standard that specifies the length of the identification number; a computer database having a plurality of identification numbers including said product identification number, and a plurality of network addresses, and associating each of said product identification numbers with at least one of said network addresses; and control means responsive to said signal and operatively coupled to said database for retrieving from said database at least one of said network addresses which corresponds to said product identification number;

a method for generating the address of a node on the network, comprising the steps of:

(a) associating in computer memory at least a portion of a product identification number with the node's network address; said identification number having recognized significance in accordance with an extrinsic standard as a number identifying an article of commerce;

(b) providing an article of commerce bearing an indicia on which said identification number is encoded;

(c) reading at least a portion of said identification number from said indicia; and (d) retrieving from said computer memory the network address associated therein with said product identification number.

23. The method according to claim 22 wherein said identification number is a Universal Product Code.

24. The method according to claim 22 where said network address is a Uniform Resource Locator.

25. The method according to claim 22 wherein said indicia is encoded in machine-readable format.

26. The method according to claim 22 where said indicia is encoded in human-readable format.

27. The method according to claim 22 wherein said step of reading is performed using a bar code reader.

28. The method according to claim 22 wherein said step of reading is performed by a human reading said indicia and entering said identification number using a keyboard.

29. The method according to claim 22 wherein the database has one or more tables containing said identification number and said network address.

30. The method according to claim 29 wherein said tables are distributed over a plurality of computers.

31. The method according to claim 29 wherein said tables are resident on a single computer.

32. The method according to claim 22 wherein said identification number is an EAN code.

33. An apparatus for using an article of commerce to access a remote computer, comprising:

(a) a machine-readable indicia associated with the article of commerce, said indicia encoding at least one of a plurality of identification numbers, said encoded identification number corresponding to the article in accordance with an extrinsic standard;

(b) an input device generating a signal corresponding to said encoded identification number; and (c) a database containing a plurality of network addresses and said plurality of identification numbers, each of said identification numbers being associated with at least one of said plurality of network addresses; said database being responsive to said signal for providing one of said network addresses which is associated with said encoded identification number;

further comprising a local host in communication with said database to receive the network address provided by said database;

further comprising a network including a plurality of nodes, each associated with one of said plurality of network addresses; wherein said local host is adapted for communicating with a selected one of said nodes using said network address generated by said database.

34. The apparatus of claim 33 wherein said means for generating said signal is coupled to said local host so that said signal is communicated to said database through said local host.

35. An apparatus for using an article of commerce to access a remote computer, comprising:

(a) a machine-readable indicia associated with the article of commerce, said indicia encoding at least one of a plurality of identification numbers, said encoded identification number corresponding to the article in accordance with an extrinsic standard;

(b) an input device generating a signal corresponding to said encoded identification number; and (c) a database containing a plurality of network addresses and said plurality of identification numbers, each of said identification numbers being associated with at least one of said plurality of network addresses; said database being responsive to said signal for providing one of said network addresses which is associated with said encoded identification number;

further comprising a local host operatively coupled to said means for generating a signal; a server operatively coupled to said local host and said database; and a network including a plurality of nodes, each associated with one of said plurality of network addresses; wherein said server is adapted for communicating with a selected one of said nodes using said network address generated by said database.

36. An apparatus for using an article of commerce to generate the network address of a computer on a network, comprising:

(a) means for generating a signal corresponding to an article identification number which is used to identify the article of commerce in accordance with a standard that specifies the length of the identification number;

(b) a database having a plurality of identification numbers including said article identification number and a plurality of network addresses, and associating each of said identification numbers with at least one of said network addresses; and (c) control means responsive to said signal and operatively coupled to said database for retrieving from said database at least one of said network addresses which correspond to said article identification number; further comprising:

(d) a first network containing a plurality of nodes, each corresponding to one of said network addresses;

(e) a local host in communication with said network and said control means and adapted for communication with that one of said nodes corresponding to the network address retrieved by said control means.

37. The apparatus of claim 36 wherein said local host is a multi-user computer with a plurality of user terminals.

38. The apparatus of claim 36 wherein said local host is a single-user computer.

39. The apparatus of claim 36 further comprising a server, wherein said local host computer is remotely connected to said server and said database is resident on said server.

40. The apparatus of claim 39 wherein said communication between said local host and said one of said nodes is carried through said server.

41. The apparatus of claim 36 wherein said database is resident on said local host.

* * * * *